Aug. 13, 1957     W. J. WISSEMANN     2,802,562
HOP VINE GRASPER

Filed Jan. 21, 1955     3 Sheets-Sheet 1

INVENTOR
Walter J. Wissemann
BY Webster & Webster
ATTORNEYS

Aug. 13, 1957 W. J. WISSEMANN 2,802,562
HOP VINE GRASPER
Filed Jan. 21, 1955 3 Sheets-Sheet 2

INVENTOR
Walter J. Wissemann
BY Webster & Webster
ATTORNEYS

Aug. 13, 1957  W. J. WISSEMANN  2,802,562
HOP VINE GRASPER
Filed Jan. 21, 1955  3 Sheets-Sheet 3
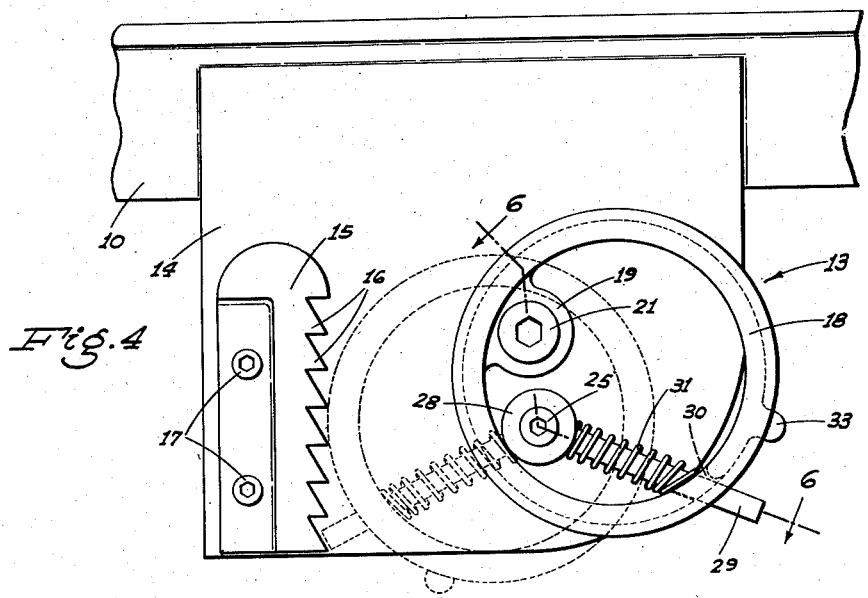
Fig. 4
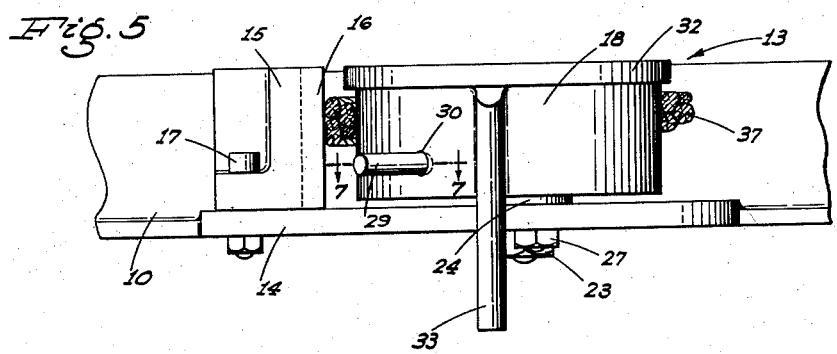
Fig. 5
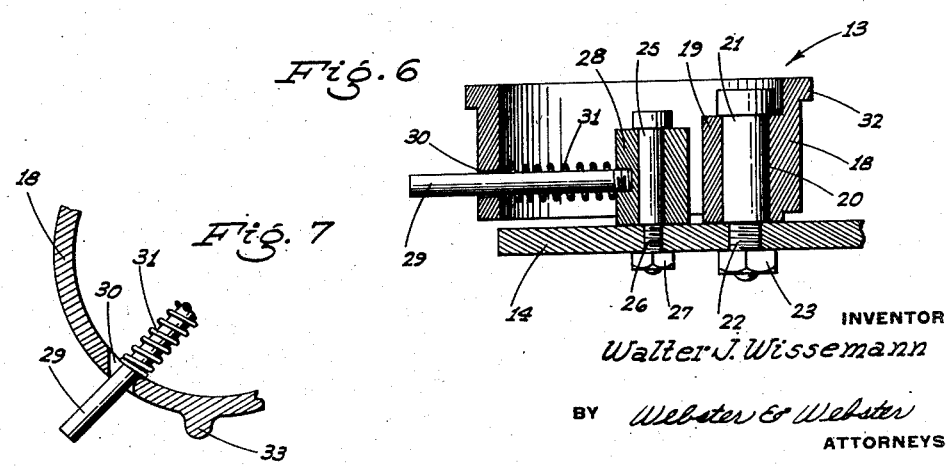
Fig. 6
Fig. 7
INVENTOR
Walter J. Wissemann
BY Webster & Webster
ATTORNEYS

United States Patent Office 2,802,562
Patented Aug. 13, 1957

2,802,562
HOP VINE GRASPER
Walter J. Wissemann, Sacramento, Calif.

Application January 21, 1955, Serial No. 483,372

2 Claims. (Cl. 198—179)

This invention relates in general to an improvement in hop picking machines.

In one type of such machines the hope vines are fed or pulled through the machine by an endless conveyor having longitudinally spaced, transverse cross bars fitted with devices known as "graspers"; each such grasper being adapted to grip or grasp the stem of a hop vine whereby the latter is pulled by the conveyor along a grasper deck and thence into and through said machine.

The major object of this invention is to provide a hop vine grasper, for the above purpose, of novel construction and function.

Another important object of the invention is to provide a hop vine grasper into which the stem of a hop vine may be placed in an easy and quick manner, and the grasper caused to close, by a simple manipulation solely of said stem by an operator; thus eliminating the necessity of actually manually engaging and closing the grasper as required in certain previous types.

An additional object of the invention is to provide a hop vine grasper, as in the preceding paragraph, which includes—on a supporting base—a fixed toothed jaw, and an annular, eccentrically pivotally mounted jaw swingable between an open position in clearance relation to the fixed jaw, and a closed position for grasping engagement with a hop vine stem engaged between said jaws; the annular, swinging jaw being adapted for snap-action, over a dead-center position, between open and closed positions, upon the vine stem being looped by the operator about said swinging jaw and then manipulated in a relatively effortless and predetermined manner, as hereinafter described.

A further object of the invention is to provide the hop vine grasper with means for automatically opening the device, to release the picked vine therefrom after its passage through the hop picking machine, before the grasper returns to the grasper deck for engagement with the next hop vine.

It is also an object of the invention to provide a hop vine grasper which is simple but rugged in structure; being designed for ease and economy of manufacture and installation.

A still further object of the invention is to provide a practical and reliable hop vine grasper, and one which will be exceedingly effective for the purpose for which it is designed.

These objects are accomplished by means of such structure and relative arrangement of parts as will fully appear by a perusal of the following specification and claims.

In the drawings:

Fig. 4 is an enlarged plan view of one of the hop vine graspers; the swinging jaw being shown in open position in full lines.

Fig. 5 is a rear end elevation of one of the hop vine graspers in closed position; i. e., with a vine stem engaged between the jaws and looped about the swinging one thereof.

Fig. 6 is a sectional elevation taken on line 6—6 of Fig. 4.

Fig. 7 is a fragmentary sectional plan taken on line 7—7 of Fig. 5.

Figure 1:
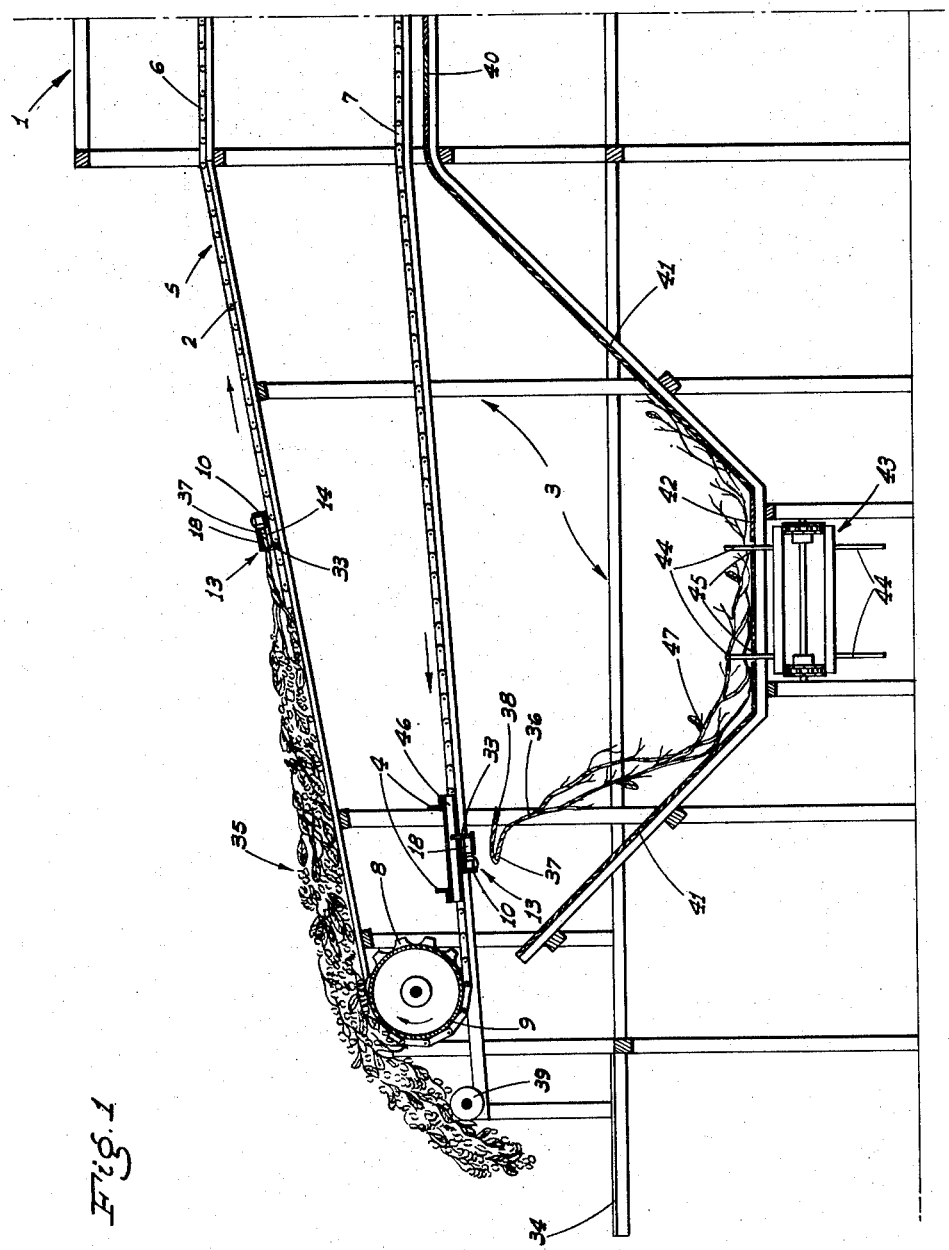
Fig. 1 is a sectional elevation, taken adjacent the near side, of the grasper deck end portion of a hop picking machine; the view being somewhat diagrammatic.
Figure 2:
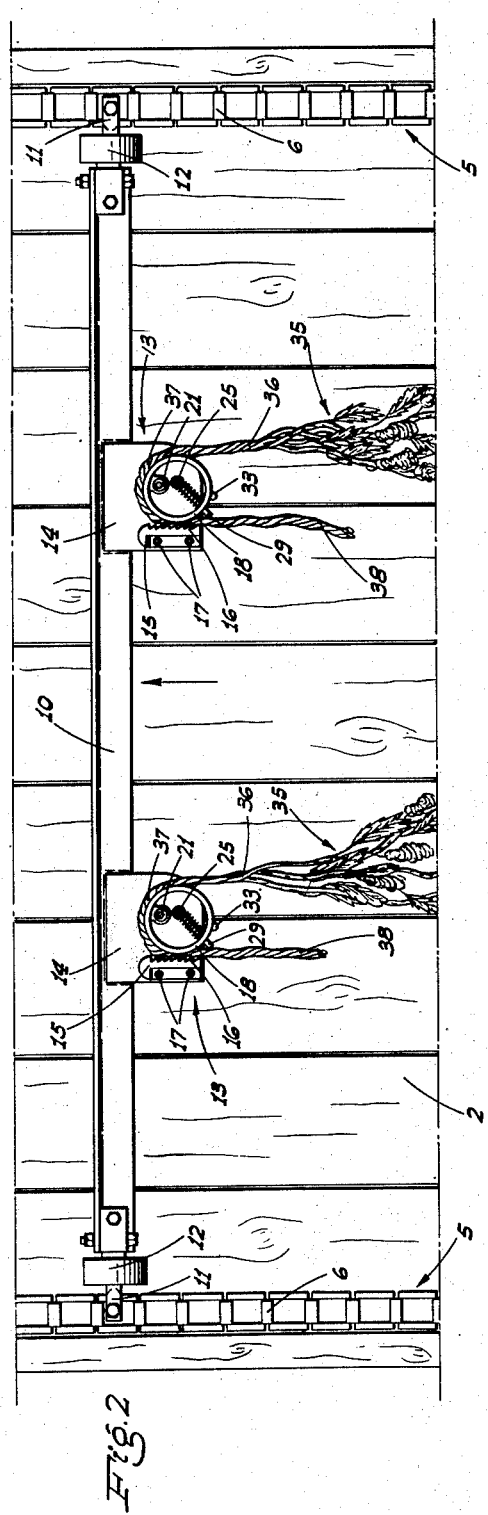
Fig. 2 is an enlarged fragmentary plan view of the grasper deck and related mechanism; the view showing a pair of the novel, hop vine graspers in use.
Figure 3:
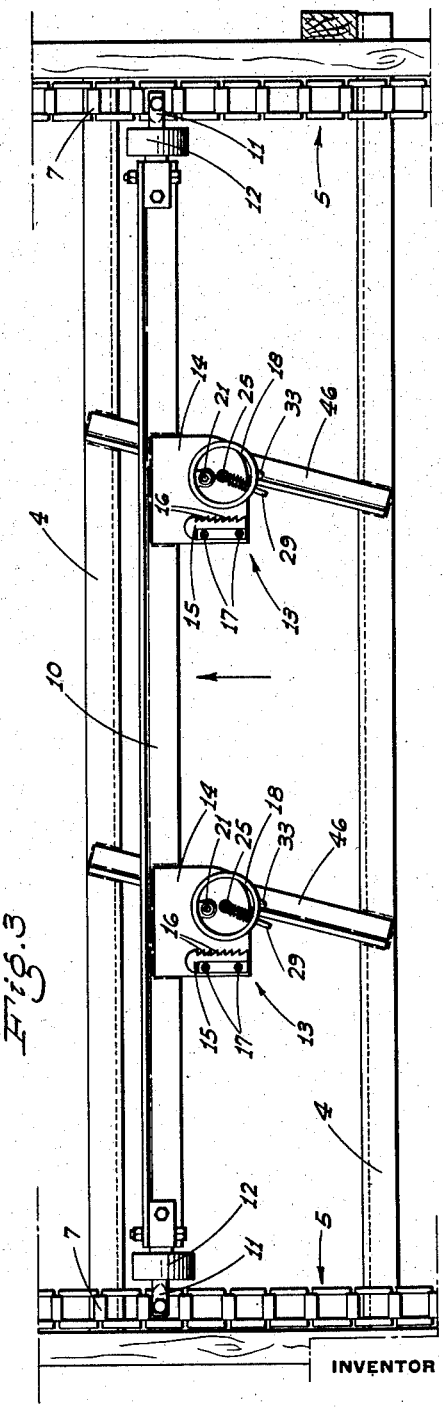
Fig. 3 is a fragmentary enlarged under side view; i. e., looking upwardly from below the grasper deck and showing particularly the frame-supported, diagonal cam bars which engage and open the returning hop vine graspers.

Referring now more particularly to the drawings, and to the characters of reference marked thereon, the present invention is embodied in a hop picking machine, indicated generally at 1, which includes—at its front end—a longitudinal, upwardly and inwardly inclined grasper deck 2; the latter being supported above ground by a suitable frame, indicated generally at 3, which frame includes a pair of transverse horizontal beams 4 secured in the frame at a predetermined position and in spaced relation lengthwise of, but below, the grasper deck 2. The purpose of the beams 4 will hereinafter appear.

The hop picking machine 1 includes, in cooperation with the grasper deck 2, a pair of transversely spaced endless chains 5 whose upper runs 6 travel along the sides of the grasper deck 2 in a direction toward the remainder of the hop picking machine; i. e., for entry into the latter.

Lower runs 7 of the chains 5 return from the machine 1 and travel outwardly to, and turn about, sprockets 8 on the corresponding ends of a transverse feed drum 9 journaled in the frame 3 at, and cooperating with, the lower end of the grasper deck 2. At longitudinally spaced points the endless chains 5 are connected by transversely extending cross or grasper bars, each of which is indicated at 10.

Each grasper bar 10 is attached at the related ends to corresponding chains 5 by attachment members 11 having rollers 12 associated therewith, as is conventional.

Each of the grasper bars 10 is fitted at transversely spaced points with one or more hop vine graspers, indicated generally at 13; each bar 10 in the present instance carrying two of said graspers.

The vine graspers 13 are of identical construction and a description of one will suffice for both.

Each hop vine grasper 13, embodying the essence of the present invention and described in relation to its position when disposed above the grasper deck 2, comprises a base plate 14 fixed to, and projecting rearwardly from, the related grasper bar 10.

Adjacent one side thereof the base plate 14 is fitted, on top, with a fixed longitudinal jaw 15 whose laterally innermost face is serrated or toothed, as at 16, with the teeth facing rearwardly, as shown.

The jaw 15 is normally fixedly but removably secured to the base plate 14 by bolts 17.

An annular, relatively wide faced swinging jaw 18 overlies the base plate 14 laterally of the fixed jaw 15; such swinging jaw 18 being formed in the forward part thereof with an inwardly projecting integral boss 19 having a bore 20 parallel to, but eccentrically offset from, the axis of said jaw. A headed pivot pin 21 extends through the bore 20 and bears against the base plate 14; such pin having a downwardly extending, reduced-diameter, threaded shank 22 which projects through said base plate, being fitted therebelow with a retention nut 23. As so mounted the jaw 18 is capable of swinging motion from an open position, as in full lines in Fig. 4, and a closed position represented generally by the dotted lines in said figure.

The boss 19 projects a short distance below the lower edge of the swinging jaw 18, as at 24, whereby said jaw does not bind on the face of the base plate 14 as said jaw swings between open and closed positions, in the manner hereinafter described.

A headed pivot pin 25 upstands from the base plate 14 adjacent but rearwardly of the pin 21, and said pin 25 is formed at its lower end with a reduced-diameter threaded shank 26 which extends through the base plate 14, being fitted therebelow with a retention nut 27.

A sleeve 28 is turnable about the headed pivot pin 25, and a radial rod 29 is secured to and projects from the sleeve 28; said rod extending in slidable relation through a bore 30 in the face of the swinging jaw 18 rearwardly of the transverse plane of pivot pin 25.

A helical spring 31 surrounds the rod 29 between the sleeve 28 and the jaw 18; said spring being under load at all times.

The bore 30 is formed in the swinging jaw 18 at a point such that said bore is disposed laterally outwardly of the pivot pin 25, relative to the jaw 15, when said jaw 18 is in open position, but is disposed laterally inwardly of such pin when the jaw is in closed position, as shown in Fig. 4.

With the described arrangement, and wherein the swinging jaw 18 is in an initially open position, said jaw will—when urged to rotate clockwise—move from open to closed positions with an over-dead center, snap-action; this by reason of the described arrangement of the rod 29 and compression spring 31.

In order to assure that the jaw 18 may swing about its eccentric axis, with the desired snap-action, and without the rod 29 binding in the bore 30, the latter—in relation to closing motion of said jaw—is rounded on the trailing side and straight-diagonal cut on the leading side, in the manner shown in detail in Fig. 7. This has been found to produce the best results.

Adjacent its outer edge the annular, relatively wide faced swinging jaw 18 is formed with an enlarged peripheral shoulder 32 whose purpose will hereinafter appear.

At a point diametrally opposite the boss 19 the swinging jaw 18 is fitted, at the periphery, with a trip finger 33 which is parallel to the axis of swinging motion of such jaw; said finger extending a distance below the base plate 14, and the latter being shaped so that when the jaw 18 swings between open and closed position the finger 33 may similarly move unobstructed.

In use of each hop vine grasper 13 it is initially in an open position, with the swinging jaw 18 spaced from the fixed jaw 15.

As each grasper 13, traveling with the endless chains 5 and carried by the related grasper bar 10, begins its movement upwardly of the grasper deck 2 from the lower end, an operator standing on an elevated platform 34 ahead of but below the transverse drum 9, attaches a hop vine 35 to said grasper as follows:

The operator, standing on the platform 34, receives each hop vine with its stem 36 uppermost; said operator grasping the stem at the free end portion with one hand and at an intermediate portion with the other hand, with a length of stem remaining therebetween. The operator then bends the length of the stem between his hands into a substantially half-circle, forwardly extending bow 37, which bow is loped over the forward portion of the swinging jaw 18, with said free end portion, indicated at 38, extending rearwardly between the jaws 15 and 18, and said intermediate portion extending rearwardly from the opposite side of said jaw 18.

Thereafter, while continuing—for a moment—to hold the stem in his hands, as above, the operator pulls rearwardly for an instant on said intermediate portion of the stem, while holding the free end portion against slippage between said jaws. By reason of the stem being looped about swinging jaw 18, in the manner described, the above manipulation—by the operator—of the vine stem causes said jaw 18 to be eccentrically rotated clockwise over dead-center, and to close with a snap-action, frictionally binding the adjacent portion of the stem between such jaw and the rearwardly facing teeth 16 of the fixed jaw 15.

When this occurs the operator releases the grasp of both hands on the vine stem, and thereafter the pull-resistance of the trailing vine constantly tends to rotate the jaw 18 in a closing direction, so that the grasper maintains a positive grip on the stem throughout passage of the vine through the hop picking machine 1.

While the present disclosure is of hop vine graspers which are right-handed, it will be recognized that they may also be constructed left-handed, in which event the stem 37 of each hop vine 35 would be oppositely manipulated and looped onto the swinging jaw 18.

In the present embodiment hop vines 35, two at a time, are grasped and pulled along the grasper deck 2 into the machine 1 for picking of the hops; the vines, after engagement of the stems with the related graspers 13, being pulled over the transverse drum 9, and a transverse idler roll 39 ahead of but below said drum serves not only as an initial guide medium but prevents too close approach of workers on platform 34 to the conveyor assembly.

After the hop vines 35 pass through the hop picking machine 1 they return with the lower runs 7 of chains 5, being then pulled on a return deck 40. The return deck 40 communicates with a transversely extending V-trough 41 disposed not only below the grasper deck 2 but below said lower runs 7 of the chains 5. The bottom 42 of the V-trough 41 is flat, and a transverse endless conveyor 43 runs below said flat bottom 42 in parallelism; the conveyor 43 including transversely spaced longitudinal rows of radially outwardly projecting conveyor pins 44 which—in the upper run of conveyor 43—project through longitudinal slots 45 in said bottom 42.

It will be realized that when the graspers 13 return with the lower runs 7 of chains 5, said graspers are inverted, and when the latter reach a point adjacent but short of the sprockets 8 the then upstanding trip fingers 33 engage and ride along diagonal cam bars 46 fixed to, and spanning between, the beams 4. The cam bars 46 are disposed in such position and diagonaled at such an angle that as the trip fingers ride therealong they are shifted laterally in a direction to cause snap-action of the swinging jaws 18 in a grasper opening direction. As a result, the graspers 13—as they return to the grasper deck 2—are open and ready for reception of the next hop vine stem.

When the inverted graspers are opened by the diagonal cam bars 46 the picked hop vines 47 have entered the V-trough 41, and the bow or loop 37 of each stem 36 falls away from the related grasper by gravity (see Fig. 1). The picked hop vines 47 are then carried away in the V-trough 41 by the conveyor pins 44 of the driven endless conveyor 43.

The purpose of the enlarged peripheral shoulder 32 on the swinging jaw 18 is to prevent escape of the stem from between the jaws 15 and 18 when the grasper is closed, and particularly when the picked hop vine is returning on the deck 40.

In a hop picking machine fitted with graspers 13 and constructed as described, the stem 36 of a hop vine can be very conveniently and quickly inserted in the grasper and the grasper caused to close wholly without any manual attention on the part of the worker other than the manipulation of said stem. This is a great advantage over previous types of hop vine graspers, wherein the movable jaw had to be tripped between open and closed position by mechanism which included a hand lever or the like.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A hop vine grasper comprising a base adapted to be attached to a longitudinally advancing conveyor and facing upwardly when advancing, a longitudinal fixed jaw secured on the base, an annular rotary jaw on the base disposed laterally of the fixed jaw and having a peripheral working face to cooperate with the fixed jaw, means pivoting the rotary jaw inwardly of said face on the base in forwardly eccentric relation to the central axis of said rotary jaw for swinging motion thereof between an open position beyond dead center toward said fixed jaw, and means between the base and rotary jaw and operating on the latter to swing the same from one position to the other subsequent to an initial swinging movement being imparted to said jaw in the corresponding direction and then yieldably maintaining the jaw in such position; the rotary jaw being of open ring-like form, and said last named means comprises a sleeve turnably mounted on the base within the rotary jaw rearwardly of the pivot of the latter, a rod projecting from the sleeve and slidably extending through the rotary jaw at a rearward lateral angle, and a loaded compression spring about the rod between the sleeve and the inner face of the rotary jaw.

2. A hop vine grasper comprising a base adapted to be attached to a longitudinally advancing conveyor and facing upwardly when advancing, a longitudinal fixed jaw secured on the base, an annular rotary jaw on the base disposed laterally of the fixed jaw and having a peripheral working face to cooperate with the fixed jaw, means pivoting the rotary jaw inwardly of said face on the base in forwardly eccentric relation to the central axis of said rotary jaw for swinging motion thereof between an open position beyond dead center toward said fixed jaw, means between the base and rotary jaw and operating on the latter to swing the same from one position to the other subsequent to an initial swinging movement being imparted to said jaw in the corresponding direction and then yieldably maintaining the jaw in such position, and means to impart such initial swinging movement to the rotary jaw to open the same upon advance of the conveyor to a predetermined point; such means comprising a pin rigid with and depending from the rotary jaw rearwardly of the pivot thereof, and a bar fixed relative to and extending lengthwise of the conveyor diagonally thereof and in the path of the pin for engagement therewith.

References Cited in the file of this patent

UNITED STATES PATENTS

| | | |
|---|---|---|
| 422,997 | Taylor | Mar. 11, 1890 |
| 521,971 | Betka | June 26, 1894 |
| 2,193,354 | Thys | Mar. 12, 1940 |
| 2,244,364 | Holland-Letz | June 3, 1941 |
| 2,700,452 | Regimbal et al. | Jan. 25, 1955 |

FOREIGN PATENTS

| | | |
|---|---|---|
| 14,527 | Great Britain | Oct. 1, 1908 |